Nov. 6, 1945.     D. W. FETHER     2,388,355
MACHINE FOR SHAPING FASTENERS
Filed Dec. 16, 1943     3 Sheets-Sheet 1

DONALD W. FETHER
INVENTOR.

BY H. Calvin White
Attorney

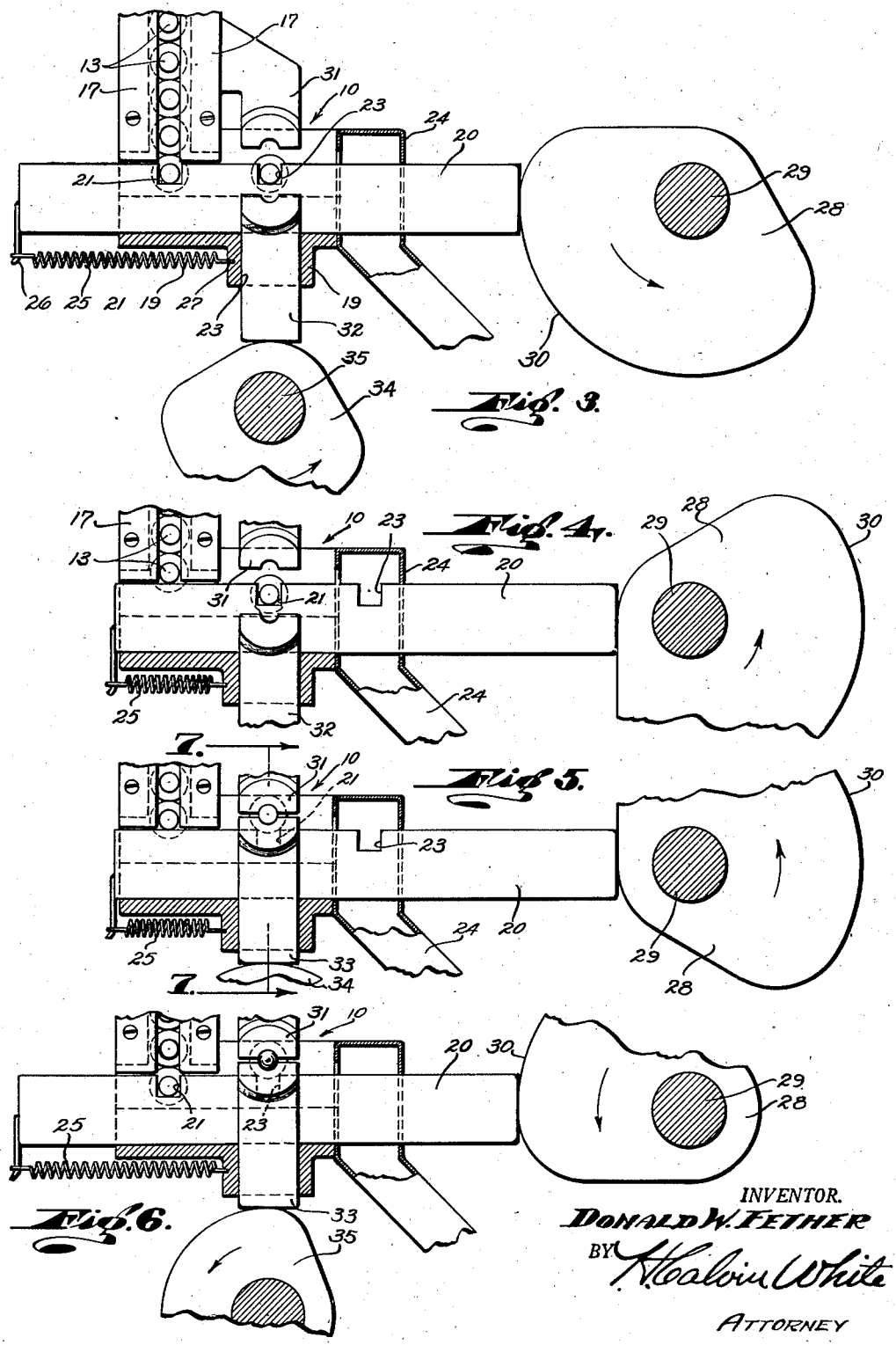

Nov. 6, 1945.　　　　D. W. FETHER　　　　2,388,355
MACHINE FOR SHAPING FASTENERS
Filed Dec. 16, 1943　　　3 Sheets-Sheet 3

Patented Nov. 6, 1945

2,388,355

UNITED STATES PATENT OFFICE 2,388,355

MACHINE FOR SHAPING FASTENERS

Donald W. Fether, Downey, Calif., assignor of twenty-four per cent to Robert Donald Fether, and twenty-four per cent to Donna Winifred Fether, both of Los Angeles, Calif.

Application December 16, 1943, Serial No. 514,466

5 Claims. (Cl. 82—2)

This invention has to do generally with automatic machines for shaping individual work pieces, and is directed particularly to mechanisms for shaping stemmed fasteners by forming (cutting) in the stem a surrounding or annular recess, as for example to adapt the stem for association with a complementary sleeve in making up a fastener assembly of a known type.

The particular problem presented for solution by the invention is that of being able to recess the stem portions of the fasteners in an operation that is fully automatic, rapid, and therefore capable of producing large quantities of the shaped fasteners at low cost. Heretofore it has been possible to shape such fasteners only by an essentially manual and lathe-type operation, requiring handling and machining of the individual pieces, and consequently involving high cost and relatively low quantity production. In accordance with the invention, it is now made possible to accomplish high speed, low cost production in a sequence of operations, in predetermined timed relation, involving automatic feeding of a succession of the unshaped fasteners, and automatic cutting of recesses in the stems as they are fed to working position in the machine.

One major object of the invention is to provide in conjunction with a suitable feed mechanism for delivering the headed fastener stock or unshaped fasteners successively into a position of longitudinal alinement with a working axis of the machine, a novel cutter assembly automatically movable with relation to the stem to form the recess therein. Preferably, I maintain the fastener against rotation by gripping the stem, and employ a rotary cutter which is moved to and from cutting relation to the stem, in a timed sequence.

The cutting mechanism advantageously may comprise a rotatably driven cutter body having a stem-receiving opening or bore, and movable reciprocally and longitudinally of the working axis to receive and then retract from the stem end of the fastener. A radially movable cutter carried by the body is actuated in such timed relation to the body travel that upon movement of the body about the stem, the cutter is thrust radially against the stem to form the recess, and the cutter and body then are sequentially retracted from the stem to permit its ejection and replacement by a successive fastener to be shaped.

The structure and operation of the invention, as well as all of its various features and objects, will be understood from the following detailed description of a typical and illustrative embodiment of the invention. Throughout the description reference is had to the accompanying drawings, in which:

Figs. 3, 4, 5 and 6 are enlarged scale views taken in the plane of line X—X in Fig. 1, showing the feed mechanism in sequential positions of its operation;

Fig. 7 is a fragmentary enlarged section on line 7—7 of Fig. 5; and

Figs. 8 and 9 are views similar to Fig. 7, showing the parts in progressive operating positions.

Figure 1:
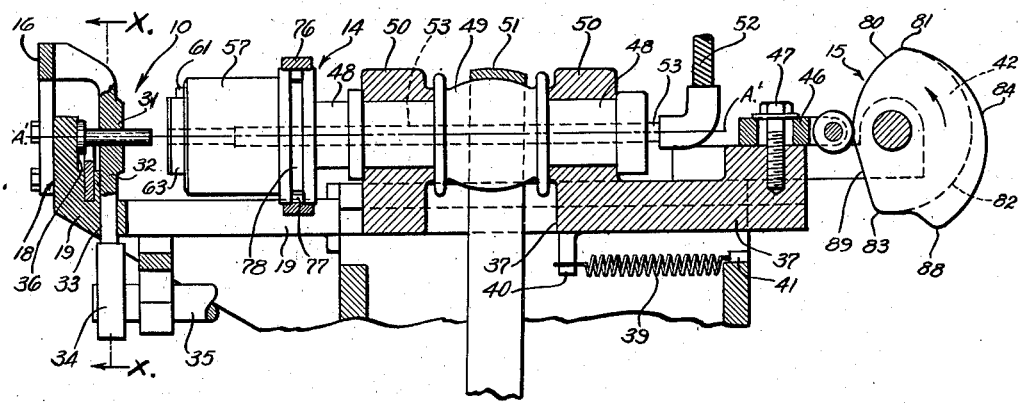
Fig. 1 is a vertical sectional view of the apparatus taken on line 1—1 of Fig. 2.
Figure 2:
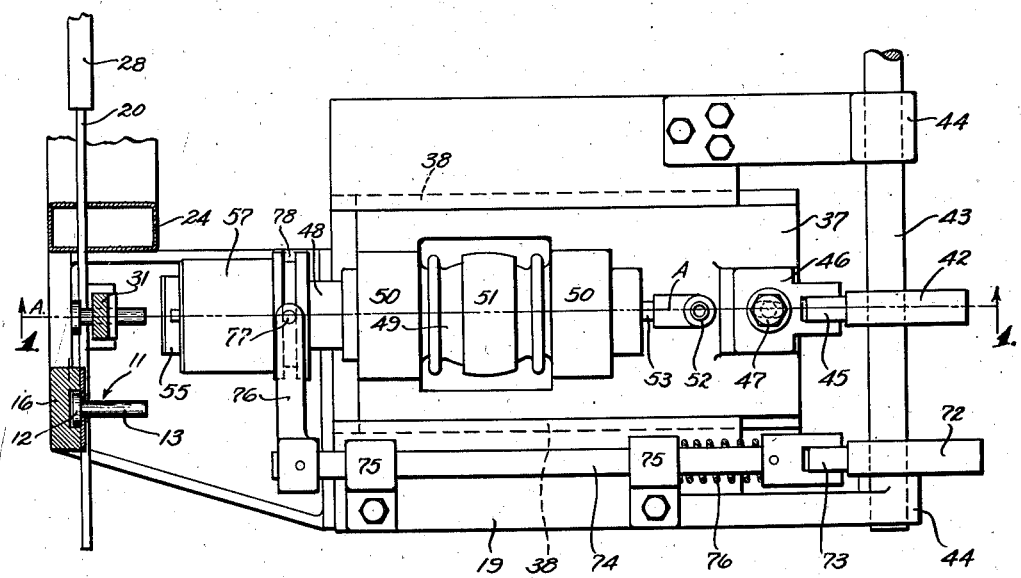
Fig. 2 is a plan view of Fig. 1.

Referring first to Figs. 1 and 2, the apparatus comprises an automatic feed mechanism, generally indicated at 10, which in certain broad aspects of the invention may be of any suitable type, operable to feed into and out of alinement with what may be referred to as the working axis A—A, a succession of the fasteners to be shaped by the mechanism. Each fastener 11 is shown to be of rivet form, comprising a head 12 and an elongated stem 13. When brought into alinement with the axis A—A, each fastener 11 is engaged by cutter mechanism, generally indicated at 14, actuated by a cam assembly 15 to move toward and away from the fastener in timed relation with the action of the feed mechanism 10, and to cut in the portion of the stem 13, an annular recess, all as will appear in the following.

The feed mechanism 10 is shown typically to comprise a vertically positioned chute 16 containing the fasteners with their stems 13 projecting forwardly and the heads 12 confined within the chute channel by guide plates 17. As shown in Fig. 1 the chute 16 is supported at 18 on the frame or bed 19 of the machine, as is also a laterally reciprocating shift bar 20 positioned directly below the chute so that when alined therewith, notch 21 in the bar receives the stem portion of the lowermost fastener being fed from the chute. The function of notch 21 is to contain the fastener for shifting from the position of Fig. 3 to that of Fig. 4, in which the fastener is brought into axial alinement with the working axis A—A. The shift bar 20 contains a second notch 23, the purpose of which, as will appear, is to remove the shaped fastener from the position of Fig. 3 into a discharge chute 24 through which the bar 20 extends as best illustrated in Fig. 2.

Displacement of the shift bar 20 toward the left is resisted by a spring 25 attached at 26 to the bar and at 27 to the frame 19. Shifting of the bar is accomplished by a cam 28 carried on a shaft 29 rotating at constant speed the surface of the cam engaging the end of the bar, as illustrated. The cam profile is symmetrical, having a relatively large radius surface 30 maintaining the bar 20 in a position of repose over a period of time sufficient for movement of the cutter mechanism into and out of cutting association with the stem, as will appear. Associated with the feed mechanism is a stationary jaw 31 and a vertically movable jaw 32 guided within the frame at 33 and actuated by a cam 34 on a shaft 35 rotating at constant speed.

Considering the operation of the feed mechanism, assume the parts to be in the position of Fig. 3 in which the fastener in the shift bar notch 33 has just been acted upon and shaped by the cutter mechanism, and a successive fastener has been fed from the chute 16 into notch 21. Upon rotation of the cam 28 to the position of Fig. 4, the bar 20 is shifted by the spring 25 to displace and discharge the fastener from notch 23 into the chute 24 and to shift the successive fastener in notch 21 into alinement with the vertical plane of the working axis A—A. In the latter position, and during its transverse shifting, the head end of the fastener is supported by engagement with surface 36 on the frame. Following the position of Fig. 4, the jaw 32 is elevated by the cam 34 to raise the fastener from notch 32 into engagement with the stationary jaw 31 and into alinement with the working axis in the position of Fig. 5. The fastener now is held between the jaws against rotation and in a position to be acted upon by the cutter. While the fastener is being shaped by the cutter, cam 28 shifts bar 20 to the position of Fig. 6 to receive a successive fastener from the chute into notch 21 and to bring notch 23 into position to receive the shaped fastener from the jaws, all as appearing in Fig. 6. Upon continued rotation of the cams, the movable jaw 33 drops to bring the shaped fastener down into the notch 23 as in the position shown in Fig. 3.

Referring again to Figs. 1 and 2, the cutter and directly associated parts of the mechanism comprise a carriage 37 reciprocable in the direction of the working axis A—A within dovetail ways 38 in the frame structure 19. The carriage is actuated in its reciprocating movement by a suitable spring 39, shown typically in Fig. 1 as attached to the carriage arm 40 and to the stationary frame at 41, and by a cam 42 carried on a shaft 43 journaled within the frame-supported bearings 44. The cam 42 is engaged by a follower roller 45 carried by an adjustable support 46 attached to the carriage by screw 47.

A tubular spindle 48 carrying a pulley 49 is journaled for rotation within bearings 50 supported by or integral with the carriage 37. The spindle is rotated by a belt 51 applied to the pulley and driven from a suitable power source, not shown, it being understood that the belt constantly rotates the spindle. Liquid for washing away the cuttings from within the cutter mechanism proper, is supplied from flexible conduit 52 through a stationary pipe 53 extending within the spindle bore 54 to the end thereof as shown in Figs. 7 to 9.

Referring now to the last named views, the cutter mechanism comprises a body including an inner section 55 threaded at 56 on the end of the spindle 48, and an outer sleeve section 57 movable axially relative to section 55 and containing a way 58 receiving a key 59 contained within the inner section. Fluid from pipe 53 is discharged through bore 60 against the cutter 61 and out through the passage 62 within the lower portion of the stationary body section. Applied to the outer end of the body is a plate 63 containing an annulus or guide 64 through which the fastener stem 13 is received in the advanced positions of the cutter assembly shown in Figs. 8 and 9.

The cutter 61 comprises a plate movable radially within the body section 15 and having a cutting edge 65 shaped to cut the end portion of the stem 13 to the shape shown in Fig. 9 wherein the stem is shown to have been recessed at 66 at a location near its end. Inward radial movement of the cutter 61 is resisted by a leaf spring 67 held within a recess 68 between the body sections and extending within the recess 71 into the notched portion 69 of the cutter. Upon movement to the left of the sleeve 57 relative to section 55, the cutter 61 is cammed inwardly against the stem by engagement with the tapered sleeve bore 70, and upon retraction of the sleeve, the cutter is returned to its outer position by the spring 67.

The sleeve 57 is moved axially with relation to section 55 in predetermined sequential relation to advancement of the spindle carried parts by a second cam 72 carried on the shaft 43, engaged by a roller follower 73 carried by rod 74 supported within bearings 75. The follower is suitably urged against the cam, as by a coil spring 76. Shaft 74 carries at its outer end a segmental collar or throw yoke 76 having pins 77 projecting within an annular recess 78 in the sleeve 57.

In considering now the operation of the cutter mechanism, assume the fastener stem 13 to have been elevated by the jaw 33 to the position of Fig. 5, as previously described, which position corresponds to the cutter position shown in Fig. 7. Assume also that all the shafts 29, 35 and 43 rotate at the same constant speed. From the position of Fig. 7 the rotating spindle 48 and the cutter body assembly is advanced by the cam 42 to the position of Fig. 8 in which the end portion of the stem 13 is received through the guide 64 within the body bore 60 opposite the cutter 61. Simultaneously rod 74, yoke 76 and therefore the sleeve 57 are advanced with the spindle 48, it being shown in Fig. 1 that the two cams 42 and 72 have exactly the same advancing profiles at 80. Upon rotation of the end points 81 of the profiles past the followers 45 and 73, the spindle and inner body section 55 remain in the same advanced position by reason of the uniform circular curvature 82 of cam 42 around to the point 83. Beyond point 81, however, the profile 84 of cam 72 is one of radial increase so that upon reaching the position of Fig. 8, the sleeve 57 then is advanced about section 55 to the position of Fig. 9 and during the sleeve advancement the cutter 61 is progressively moved inwardly against the stem to cut and shape the stem. In this operation the cutter forms both the recess 66 and rounds the end of the stem at 86 to an abrupt edge at 87.

Referring again to Fig. 1, it will be noted that surface 84 of cam 72 terminates at 88 angularly in advance of the termination at 83 of surface 82 of the cam 42; the result being that upon reaching the position of Fig. 9, sleeve 57 is retracted to return the cutter 61 to its outer radial position, or at least to a position at which it will clear the shaped stem, in advance of retractive movement of the carriage and spindle assembly. Following such advance retraction of the sleeve, the carriage supported parts, rod 74 and the yoke 76 are returned together to the retracted position of Fig. 1 as the followers travel the cam surfaces 89.

I claim:

1. Mechanism for shaping stemmed fasteners, comprising automatic means for feeding a succession of individual fasteners into and out of alinement with a working axis, means holding each fastener stem against rotation when alined with said axis, a rotatably driven cutter body having a bore and movable axially with relation to said stem to receive the stem within said bore, a cutter carried by said body and movable radially with relation to a stem received within said bore, a spring resisting radial movement of the cutter toward the stem, cam means for advancing said body toward the stem, yielding means resisting such advancement of said body, and cam means operating at an advanced position of the body to move said cutter radially against the stem to form an annular recess in the outer surface thereof.

2. Mechanism for shaping stemmed fasteners, comprising automatic means for feeding a succession of individual fasteners into and out of alinement with a working axis, means holding each fastener stem against rotation when alined with said axis, a reciprocating carriage movable longitudinally of said stem, a cutter body mounted on said carriage and having a bore to receive the stem, means for rotating said body, a cutter carried by said body and movable radially with relation to a stem received within said bore, means for advancing said carriage and body to a position at which the stem is received within the body bore, and cam means then operating to move said cutter radially against the stem to form an annular recess in the outer surface thereof.

3. Mechanism for shaping fasteners having headed and stem ends, comprising automatic means for feeding a succession of individual fasteners into and out of alinement with a working axis, means holding each fastener against rotation when alined with said axis, a reciprocating carriage movable longitudinally of the fastener stem, a cutter body mounted on said carriage and movable therewith toward and away from an advanced position at which the stem is received within a bore in said body, means for rotating the body, a cutter carried by the body and movable radially with relation to a stem received within said bore, cam means for advancing said carriage and body to a position at which the stem is received within said bore, and cam means then operating to move said cutter radially against the stem to form an annular groove in the outer surface thereof.

4. Mechanism for shaping stemmed fasteners, comprising automatic means for feeding a succession of individual fasteners into and out of alinement with a working axis, means holding each fastener stem against rotation when alined with said axis, a rotatably driven cutter body comprising an inner section having a bore and movable axially with relation to said stem to receive the stem within said bore, a sleeve section surrounding said inner section and movable axially thereof, a cutter carried by said body and movable radially with relation to a stem received within said bore by virtue of axial movement of said sleeve section relative to said inner section and engagement of said cutter by an angular annular shoulder within the sleeve, a spring resisting inward radial movement of the cutter, means for advancing said body toward the stem, and means operating at an advanced position of the body to move said sleeve axially relative to said inner section and thereby move said cutter against the stem.

5. Mechanism for shaping stemmed fasteners, comprising automatic means for feeding a succession of individual fasteners into and out of alinement with a working axis, means holding each fastener stem against rotation when alined with said axis, a rotatably driven cutter body comprising an inner section having a bore and movable axially with relation to said stem to receive the stem within said bore, a sleeve section surrounding said inner section and movable axially thereof, a cutter carried by said body and movable radially with relation to a stem received within said bore by virtue of axial movement of said sleeve section relative to said inner section and engagement of said cutter by an angular annular shoulder within the sleeve, a spring resisting inward radial movement of the cutter, cam means for advancing said body toward the stem, cam means operating after the body has reached such advanced position to move said sleeve axially relative to said inner section and thereby move said cutter against the stem, and means operating to sequentially retract the cutter radially from the stem and to move the body axially away from the stem.

DONALD W. FETHER.